(12) United States Patent
Young et al.

(10) Patent No.: US 6,488,235 B1
(45) Date of Patent: Dec. 3, 2002

(54) FLEXIBLE STRUCTURAL FRAME

(75) Inventors: Kendall G. Young, Tarrant, TX (US); Steven L. Pauletti, Mesquite, TX (US); Douglas W. Leggett, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 51 days.

(21) Appl. No.: 09/804,594

(22) Filed: Mar. 12, 2001

(51) Int. Cl.$^7$ .................................................. B64C 1/14
(52) U.S. Cl. ..................................................... 244/129.5
(58) Field of Search .......................... 244/129.5, 129.4; 49/316, 317, 318, 319, 320, 321, 315, 310, 505

(56) References Cited

U.S. PATENT DOCUMENTS

| | | |
|---|---|---|
| 2,207,065 A | 7/1940 | McCormick |
| 2,792,599 A | 5/1957 | Gantschnigg et al. |
| 2,805,451 A | 9/1957 | Evans et al. |
| 3,252,255 A | 5/1966 | Marpe |
| 3,262,226 A | 7/1966 | Persson |
| 3,267,612 A | 8/1966 | Horvat et al. |
| 3,512,303 A * | 5/1970 | Wright .......................... 49/309 |
| 3,562,954 A | 2/1971 | Duguay |
| 3,816,966 A | 6/1974 | Sause, Jr. ..................... 49/317 |
| 4,128,967 A | 12/1978 | Kirsch .......................... 49/318 |
| 4,307,542 A | 12/1981 | Lense .......................... 49/318 |
| 4,656,779 A | 4/1987 | Fedeli .......................... 49/318 |
| 5,277,384 A * | 1/1994 | Webb ....................... 244/129.3 |
| 5,676,381 A * | 10/1997 | Buzzoni et al. ................ 277/34 |
| 6,009,669 A * | 1/2000 | Jardine et al. ................ 49/316 |
| 6,059,230 A | 5/2000 | Leggett et al. ........... 244/129.5 |

FOREIGN PATENT DOCUMENTS

DE 0303102 A2 * 7/1988 ............. F16J/15/10

* cited by examiner

Primary Examiner—Charles T. Jordan
Assistant Examiner—Kevin Jakel
(74) Attorney, Agent, or Firm—Baker Botts L.L.P.

(57) ABSTRACT

A flexible structural frame (100) includes a structure (110) having a passage (112), the walls (114) of the passage (112) defining an opening (116). The flexible structural frame (100) also includes a piece of elastomeric material (120) that has a first surface (122) and a second surface (124). The first surface (122) of the elastomeric material (120) is coupled to at least one of the walls (114) of the passage (112). The flexible structural frame (100) further includes at least one rigid member (130) coupled to the elastomeric material (120) and at least one tension bearing member (140) coupled to the rigid member (130), such that the elastomeric material (120) is compressed when the tension applied to the tension bearing member (140) increases.

23 Claims, 2 Drawing Sheets

6,488,235 B1

FLEXIBLE STRUCTURAL FRAME

TECHNICAL FIELD OF THE INVENTION

This invention relates generally to the field of aerospace structures and, more specifically, to a flexible structural frame, a method for its construction, and a method for its use.

BACKGROUND OF THE INVENTION

Aircraft have a variety of doors, which are a type of panel, along the exterior surface of the airframe. Examples are the main cabin door, the landing gear doors, the cargo doors, and, in military aircraft, the bomb bay doors. While the exterior surfaces of the doors can be manufactured to be substantially flush with the exterior surface of the airframe, discontinuities will exist between the perimeter of the doors and the exterior surface of the airframe. These discontinuities create opportunities for gaps to exist and/or develop between the doors and the exterior surface. These gaps can be detrimental to an aircraft's aerodynamic characteristics because they produce drag. Thus, eliminating, or at least mitigating, any gaps between the doors and the exterior surface of the airframe is a significant advantage.

One conventional structural technique used to mitigate the gaps between a door and the exterior surface of the airframe, which are both fairly rigid structures, is to make the perimeter of the door approximately the same size as the opening in the airframe. However, the perimeter of the door may approximate the size of the opening only so closely because some nominal gap is required for the door to be able to operate. Furthermore, if either the door or the airframe deforms during the operation of the aircraft, perhaps due to aerodynamic loads or heat, gaps may form between the door and the exterior of the airframe. Another approach has been to use all out-of-plane sealing devices, such as flex seals, blade seals, or scuff seals. However, these devices can also degrade the aerodynamic characteristics of the aircraft, are dangerous to maintenance workers, and require extensive maintenance. A further approach has been to construct a flexible door. This type of door has a compressible strip fixed between two relatively movable plates that are linked in such a way that they cause the strip to compress or expand as desired. A disadvantage of this approach is that it adds substantial weight to the door, making the door harder to handle and requiring more powerful hydraulic devices than might otherwise be required. Therefore, a need has arisen for a new technique to mitigate the gaps between an aircraft door and the exterior surface of the airframe.

SUMMARY OF THE INVENTION

The present invention provides a technique–methods and apparatus–that substantially reduces or eliminates at least some of the disadvantages and problems associated with previously developed gap mitigation techniques. Accordingly, the present invention provides a flexible structural frame, a method for its construction, and a method for its use.

In one embodiment, a flexible structural frame is disclosed. The flexible structural frame includes a structure having a passage, the walls of the passage defining an opening. The flexible structural frame also includes a piece of elastomeric material that has a first surface and a second surface. The first surface of the elastomeric material is coupled to at least one wall of the passage. The flexible structural frame further includes at least one rigid member that is coupled to the elastomeric material and at least one tension bearing member that is coupled to the rigid member, such that the elastomeric material is compressed when the tension applied to the tension bearing member increases.

In another embodiment, a method for constructing a flexible structure is also disclosed. The method includes three steps. Step one calls for forming a piece of elastomeric material that has a first surface and a second surface and that contains at least one rigid member coupled to a tension bearing member. Step two requires forming a passage in a structure, the passage having walls that define an opening. The final step requires coupling the first surface of the elastomeric material to at least one wall of the passage, such that the elastomeric material is compressed when the tension applied to the tension bearing member increases.

The present invention has several technical advantages. One technical advantage is that the flexible structural frame mitigates any gaps between a door of an aircraft and the exterior surface of the airframe. Thus, the aerodynamic characteristics of the aircraft are improved. Another technical advantage is that the flexible structural frame can compress and expand to accommodate for any deformations in either the door or the airframe during the operations of the aircraft. Thus, any gaps that form after the door is closed can be mitigated. A further technical advantage is that the gaps between an aircraft door and airframe can be reduced without adding any additional weight to the door.

Other technical features and advantages will be obvious to one of skill in the art from the following figures, description, and claims.

BRIEF DESCRIPTION OF THE DRAWINGS

For a more complete understanding of the present invention, and for further features and advantages, reference is now made to the following drawings, in which.

DETAILED DESCRIPTION OF THE INVENTION

Figure 1:
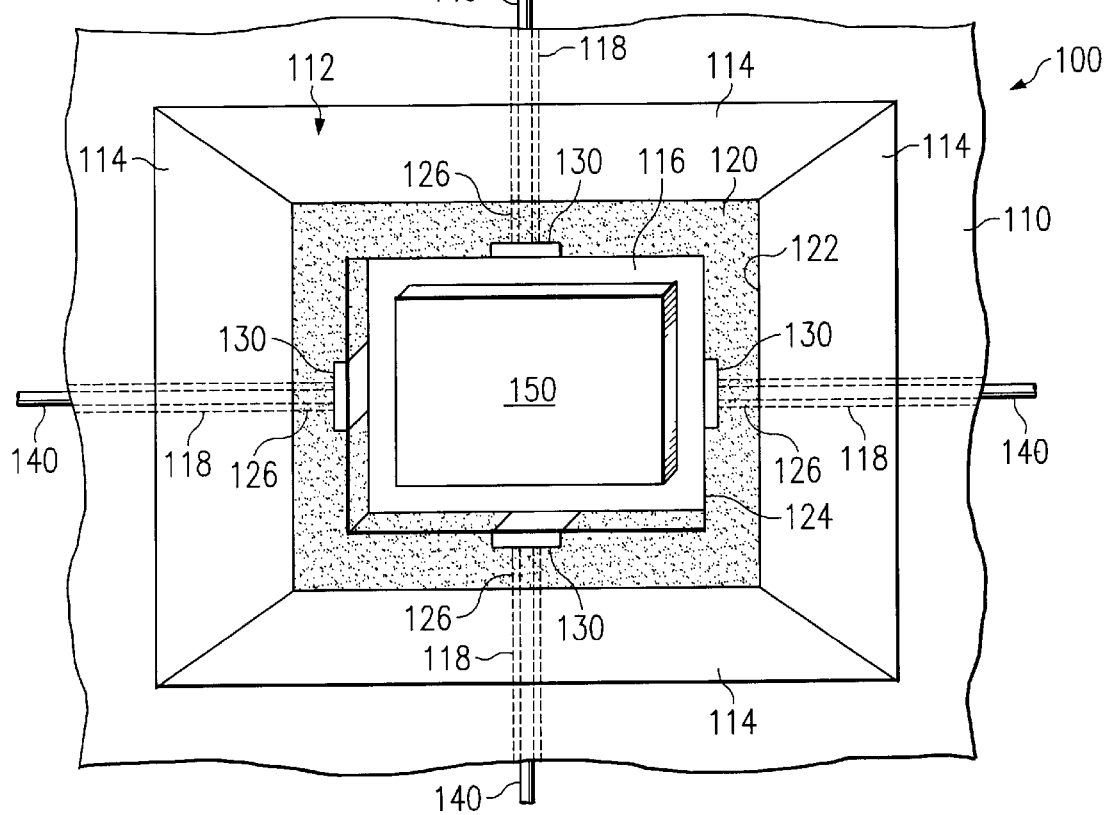
FIG. 1 illustrates a flexible structural frame constructed in accordance with the invention.

FIG. 1 illustrates a flexible structural frame 100 constructed in accordance with the present invention. In general, flexible structural frame 100 includes a structure 110 with a passage 112. Passage 112 contains a piece of elastomeric material 120 mounted therein. Coupled to elastomeric material 120 are rigid members 130, and coupled to each rigid member 130 is one of tension bearing members 140. Thus, when the tension applied to tension bearing members 140 is increased, rigid members 130 compress elastomeric material 120 against structure 110.

In more detail, passage 112 of structure 110 has walls 114 that define an opening 116 in structure 110. Elastomeric material 120, which has a first surface 122 and a second surface 124, is coupled to walls 114 along first surface 122.

Thus, elastomeric material 120 decreases the size of opening 116 where elastomeric material 120 couples to walls 114. Coupled to elastomeric material 120 are rigid members 130. Coupled to each of rigid members 130, in turn, is one of tension bearing members 140. Each tension bearing member 140 passes through one of slots 126 in elastomeric material 120 and one of apertures 118 in structure 110.

In operation, tension bearing members 140 may have the tension applied to them increased or decreased. Increasing the tension applied to tension bearing members 140 causes rigid members 130 to move towards walls 114 of passage 112, compressing elastomeric material 120 between rigid members 130 and walls 114, thereby increasing the size of opening 116 adjacent to elastomeric material 120. Thus, a panel 150, which is larger than the size of opening 116 adjacent to elastomeric material 120 when no tension is applied to tension bearing members 140, may be inserted into opening 116 adjacent to elastomeric material 120 with elastomeric material 120 compressed. After the insertion of panel 150, decreasing the tension applied to tension bearing members 140 allows elastomeric material 120 to expand and engage the edges of panel 150. In this way, elastomeric material 120 expands to mitigate any gaps between flexible structural frame 100 and panel 150. Moreover, if flexible structural frame 100 and/or panel 150 later deforms, elastomeric material 120 can expand and/or compress to again mitigate any gaps between flexible structural frame 100 and panel 150. When panel 150 is to be removed, the tension applied to tension bearing members 140 is again increased, again compressing elastomeric material 120 and enlarging opening 116 adjacent to elastomeric material 120. Then, panel 150 may be removed.

In particular embodiments, elastomeric material 120 may only be coupled to one of the walls 114. However, compressing elastomeric material 120 will still allow panel 150 to be inserted into opening 116. In other embodiments, elastomeric material 120 may be coupled to any number of walls 114.

The ability to mitigate gaps between flexible structural frame 100 and panel 150 is especially important in aircraft because any gaps on the surface of the aircraft can disturb airflow over the surface. Thus, mitigating the gaps reduces aerodynamic drag and improves the aerodynamic performance of the aircraft.

Structure 110 of flexible structural frame 100 may be composed of aluminum, steel, titanium, composite, and/or any other type of rigid material and may be any type of structure. Panel 150 may also be composed of aluminum, steel, titanium, composite, and/or any other suitable material. Panel 150 may be a door, a plate, or any other device that can at least partially fill an opening. Further, elastomeric material 120 may be composed of silicone, polyurethane, or any other type of flexible elastic material. For situations where flexible structural frame 100 will be used on high altitude aircraft, forming elastomeric material 120 out of silicone, Dow Corning 3-6121, for example, is especially advantageous because a silicone elastomer can retain its elastic properties at low temperatures, for example, $-50°$ F. or less. Note, however, that Dow Corning 3-6121 will require a surface coating if elastomeric material 120 may be exposed to aircraft fuel. Elastomeric material 120 may be adhered to, bonded to, molded to, fastened to, or otherwise coupled to walls 114. In addition, tension bearing members 140 may be cables, wires, rods, struts, or any other device that can have the tension applied to it increased and decreased. Tension bearing members 140 may be actuated by any of a variety of well known devices. Rigid members 130 may be blocks, plates, block and tackle devices, or any other type of device that can apply force to compress elastomeric material 120. Moreover, rigid members 130 may be mounted to the periphery of elastomeric material 120, bonded to the periphery of elastomeric material 120, bonded to the interior of elastomeric material 120, embedded in elastomeric material 120, and/or coupled to elastomeric material 120 in any other appropriate manner. Additionally, rigid members 130 may be used in combinations to compress elastomeric material 120. Rigid members 130 may be composed of steel, aluminum, titanium, composite, and/or any other suitable material.

As mentioned previously, in certain embodiments of the invention, tension bearing members 140 could be rods. Using rods as tension bearing members 140 allows elastomeric material 120 to still be compressed by an increase in tension, and has the further advantage of ensuring that elastomeric material 120 will remain in-plane during compression. Moreover, using rods as tension bearing members 140 allows elastomeric material 120 to be stretched, by increasing the compression applied to the rods. Note, however, that in some embodiments, elastomeric material 120 could compress, at least partially, out-of-plane, by buckling. Moreover, in still other embodiments, the compression and expansion of elastomeric material 120 can be achieved by pneumatic or hydraulic devices. Thus, the invention contemplates any mechanism for expanding and compressing elastomeric material 120.

Figure 2A:
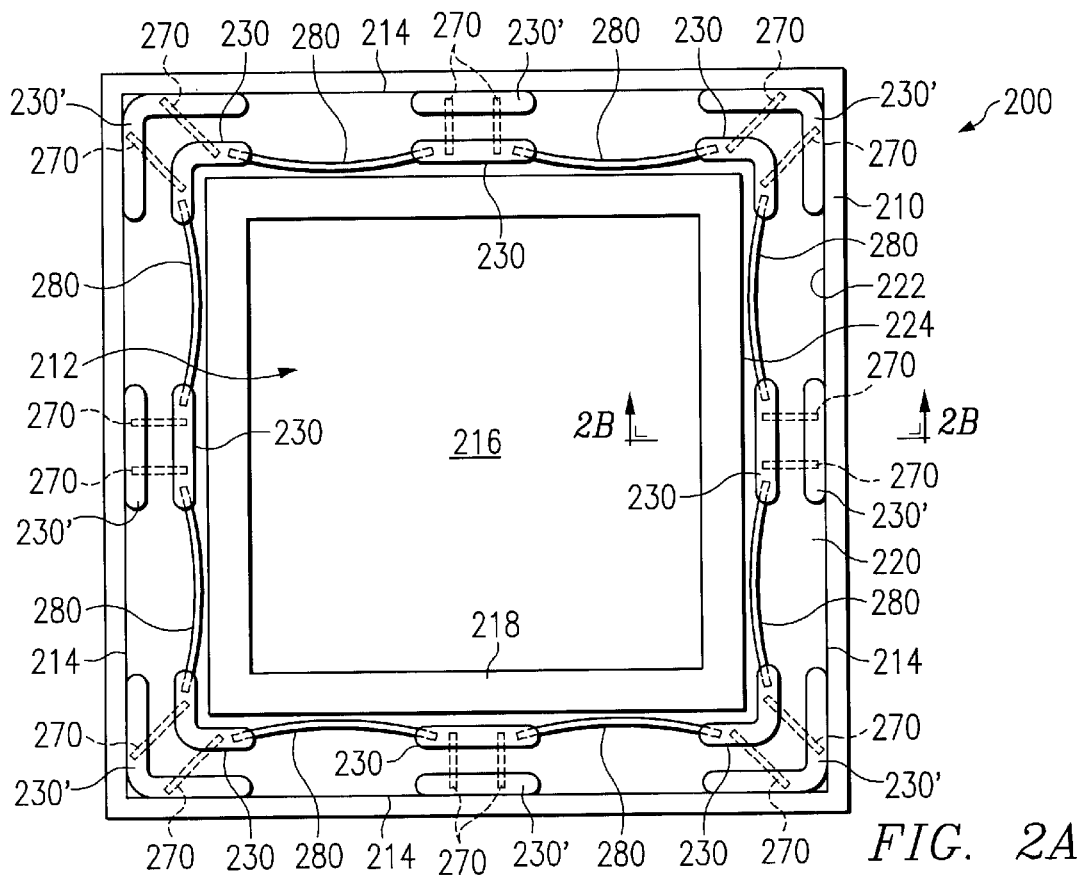
FIG. 2A illustrates an embodiment of the invention in which a flexible structural frame constructed in accordance with the present invention is used as the frame for an aircraft door.

FIG. 2A illustrates an embodiment of the invention in which a flexible structural frame 200 constructed in accordance with the present invention is used as the frame for an aircraft door (not shown), which is a type of panel. In this embodiment, an airframe 210, which is a type of structure, has a passage 212 whose walls 214 define an opening 216 in airframe 210. As before, an elastomeric material 220 with a first surface 222 and a second surface 224 is coupled along first surface 222 to walls 214 of passage 212. Note, the aircraft door is larger than the size of opening 216 adjacent to second surface 224 when elastomeric material 220 is not under compression. Also as before, elastomeric material 220 has several rigid members 230 coupled to it; in fact, in this embodiment, rigid members 230 are embedded in elastomeric material 220.

In this embodiment, however, airframe 210 also includes a door land 218 upon which the aircraft door will rest when it closes. Further, each rigid member 230 has an associated rigid member 230', which are coupled to airframe 210. Between each rigid member 230 and associated rigid member 230' is a portion of elastomeric material 220 and two of guide rods 270, which pass through elastomeric material 220. Guide rods 270 ensure that elastomeric material 220 remains in-plane when compressed between rigid members 230 and associated rigid members 230', as opposed to partially compressing and buckling out-of-plane. Guide rods 270 are lubricated to allow elastomeric material 220 to move easily relative to them. Additionally, coupled between each rigid member 230 is one of reinforcement rods 280 in elastomeric material 220. Reinforcement rods 280 assist in ensuring that elastomeric material 220 remains in-plane. Further, flexible structural frame 200 includes cables (not shown) that pass between each rigid member 230 and associated rigid member 230'.

In operation, when the aircraft door is to be closed, the tension applied to the cables is increased. This increase in tension causes each rigid member 230 to move towards associated rigid member 230', compressing elastomeric material 220. Thus, opening 216 adjacent to elastomeric material 220 enlarges when the tension applied to the cables is increased. This allows the aircraft door to be closed to the point where it rests on door land 218. Then, the tension applied to the cables may be decreased. This allows elastomeric material 220 to expand and engage the edges of the aircraft door, mitigating the gaps between flexible structural frame 200 and the aircraft door. Because the aircraft door is larger than opening 216 adjacent to elastomeric material 220 when elastomeric material 220 is not under compression, elastomeric material 220 continues to be compressed, although between the aircraft door and airframe 210 in this instance, even though the tension applied to the cables is decreased. Thus, elastomeric material 220 can accommodate any deformations in the aircraft door and/or in airframe 210 by additional expansions and/or compressions. When the aircraft door is to be opened, the tension applied to the cables is again increased, again causing elastomeric material 220 to be compressed between each rigid member 230 and associated rigid member 230', which enlarges opening 216 adjacent to elastomeric material 220, allowing the aircraft door to be opened.

Figure 2B:
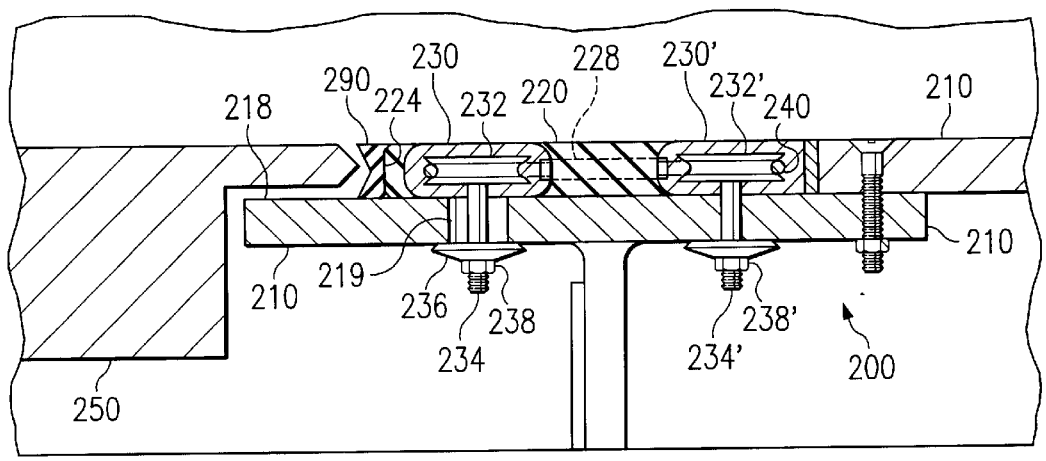
FIG. 2B illustrates in greater detail a mechanism for compressing the flexible structural frame for the aircraft door.

FIG. 2B shows a cut-away view of flexible structural frame 200 along section line 2B—2B in FIG. 2A. As can now be seen, in this embodiment, each rigid member 230 includes a sheave 232 with a shaft 234 that extends through an aperture 219 in airframe 210. Shaft 234 is captured on the opposite side of airframe 210 from sheave 232 by fastener 238. Fastener 238 is tightened against a spacer 236. Because aperture 219 is wider than shaft 234, rigid member 230 can move relative to airframe 210 in the plane of airframe 210. As can also be seen, associated rigid member 230' also includes a sheave 232', a shaft 234', and a fastener 238', which secures associated rigid member 230' to airframe 210. In addition, elastomeric material 220 includes tubes 228 through which cables 240 (mentioned earlier) pass between rigid member 230 and associated rigid member 230'. Tubes 228 are lubricated to allow cables 240 to move easily relative to them. Further, a rubber bevel 290 couples to second surface 224 of elastomeric material 220.

In operation, as the tension applied to cables 240 increases, each rigid member 230 moves towards associated rigid member 230'. Thus, the portion of elastomeric material 220 between each rigid member 230 and associated rigid member 230' compresses, enlarging opening 216 adjacent to elastomeric material 220. Then, aircraft door 250 (mentioned earlier) may be closed until it comes to rest on door land 218. After this, the tension applied to cables 240 may be decreased, causing elastomeric material 220 to expand and place rubber bevel 290 in contact with an edge of aircraft door 250, thus minimizing the gaps between airframe 210 and aircraft door 250. When aircraft door 250 is to be opened, the tension applied to cables 240 is again increased, again causing elastomeric material 220 to be compressed between each rigid member 230 and associated rigid member 230'. This causes rubber bevel 290 to move away from the edge of aircraft door 250, allowing aircraft door 250 to be opened.

The actuation of cables 240 may be accomplished by any of a variety of well known means. In particular embodiments, each cable 240 may be wound around a spool that is actuated by an electric, hydraulic, or pneumatic motor. Winding more of cables 240 around the spools will cause the tension applied to cables 240 to increase, thereby compressing elastomeric material 220, and unwinding cables 240 from the spools will cause the tension applied to cables 240 to decrease, thereby allowing elastomeric material 220 to expand. In each of these embodiments, the motor will have a manual override, for example, a lever arm, that will allow the tension in the cable to be increased in case the motor is inoperable.

Figure 3:
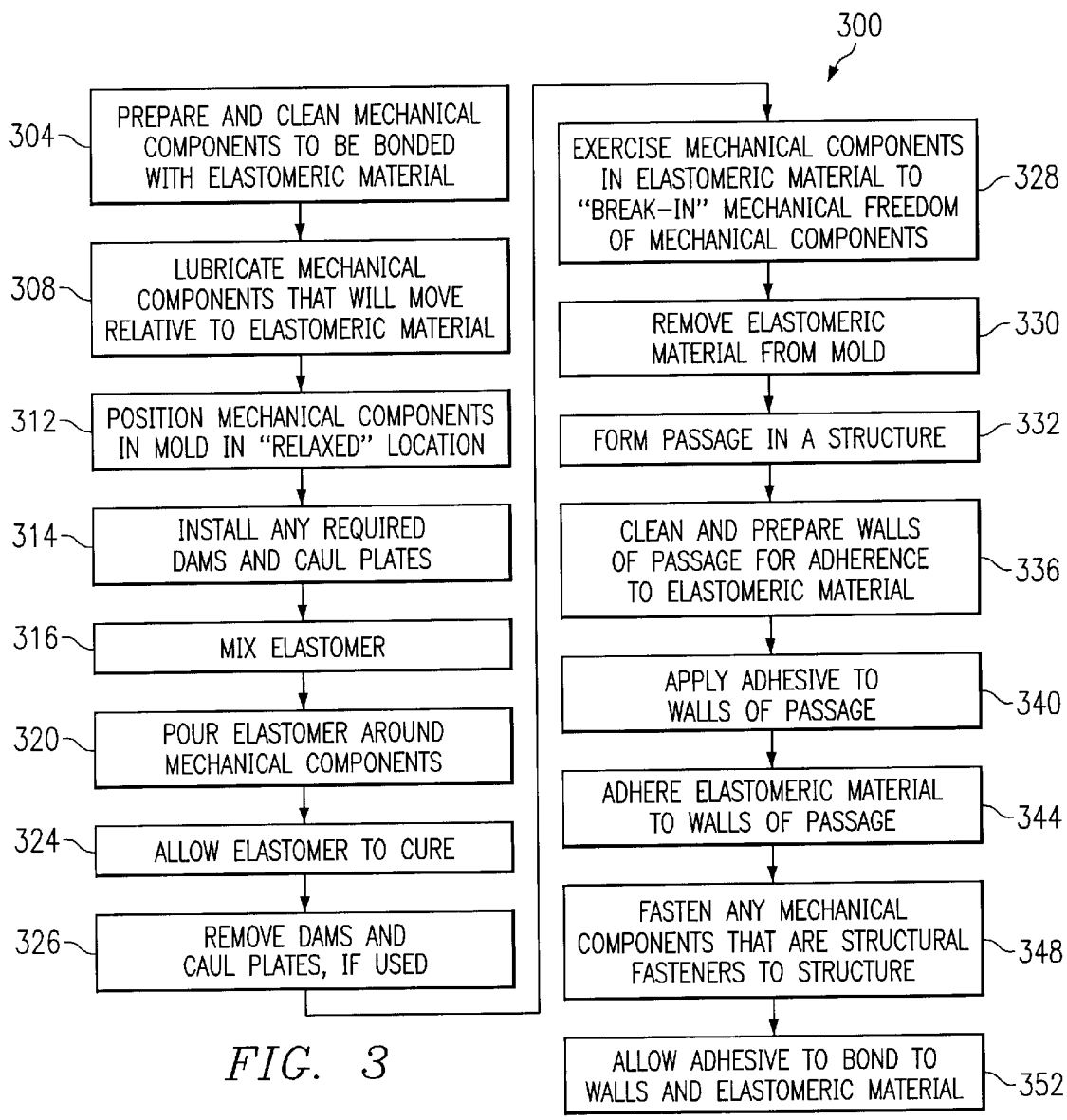
FIG. 3 is a flowchart illustrating an embodiment of a method for constructing a flexible structural frame in accordance with the present invention.

FIG. 3 is a flowchart 300 illustrating an embodiment of a method for constructing a flexible structural frame, such as flexible structural frame 100 or flexible structural frame 200, in accordance with the present invention. At step 304, the mechanical components to be bonded with the elastomeric material, such as rigid member 230, guide rods 270, tubes 228, rigid members 130, and/or tension bearing members 140, are prepared and cleaned. Then, the mechanical components that will move relative to the elastomeric material, such as tension bearing members 140, or that the elastomeric material will move relative to, such as tubes 228 and guide rods 270, must be lubricated at step 308. While there are a variety of acceptable lubricants known to those of skill in the art, a silicone grease is preferred in particular embodiments. All of the mechanical components to be bonded with the elastomeric material are positioned in a mold in their relaxed, i.e., non-stressed, locations at step 312. A bench, or other appropriate device, may be used instead of a mold. At step 314, any required dams and/or caul plates are installed. A caul plate may be used to control the inner mold surface of the elastomeric material. While a caul plate is typically used if the inner mold surface of the elastomeric material will not be flat, a caul plate may be used to tightly control the inner mold surface even when the inner mold surface is to be flat.

An elastomer, which will become the elastomeric material, such as elastomeric material 120, is mixed at step 316. Then, the elastomer is poured around the mechanical components in the mold at step 320. After this, the elastomer is allowed to cure at step 324. The curing of the elastomer can be accelerated, if desired, by the use of an oven. After the elastomeric material has been sufficiently cured, which completes the formation process, any dams and caul plates used are removed from the mold at step 326. The mechanical components bonded with the elastomeric material are exercised to break-in their mechanical freedom at step 328. The elastomeric material, along with its bonded mechanical components, is removed from the mold at step 330. Note, the elastomeric material may be removed from the mold and placed in a check fixture to exercise the components, thus inverting step 328 and step 330.

A passage is formed in a structure, such as structure 110 or airframe 210, at step 332. Then, the walls of the passage, such as walls 114, are cleaned and prepared for adherence to the elastomeric material at step 336. In a particular embodiment, the walls of the passage are prepared for application of the adhesive by applying a primer, such as Dow Corning 1200. Next, an adhesive is applied to the walls of the passage at step 340. The adhesive that bonds the elastomeric material to the walls could be any of a variety of adhesives well known to those skilled in the art. After this, the elastomeric material is adhered to the walls of the passage at step 344. At step 348, any of the mechanical components that have structural fasteners, such as shaft 234 of sheave 232, are fastened to the structure. The adhesive is then allowed to bond to the walls of the passage and the elastomeric material at step 352.

Although flowchart 300 illustrates one embodiment of a method for constructing a flexible structural frame in accordance with the present invention, a variety of other embodiments exist. For instance, certain steps could be added to, deleted from, or switched in flowchart 300 while still producing a flexible structural frame in accordance with the present invention.

Although the detailed discussion of flexible structural frame 100 and flexible structural frame 200 has focused on mitigating gaps between an aircraft door and an airframe, flexible structural frames in accordance with the present invention are also useful in a variety of other situations. For example, flexible structural frame 100 could be used to mitigate gaps around any panel on the surface of an airframe. Moreover, flexible structural frame 100 could be used for mitigating gaps around any door and/or panel on the interior of an airframe, in a bulkhead of the airframe, or elsewhere. In addition, flexible structural frame 100 could be used for mitigating gaps around panels and/or doors on ships, submarines, cars, and houses. Further, flexible structural frame 100 could be used for sealing doors and/or panels so that environmental elements do not penetrate the surface of a structure. A variety of other uses exist.

Although several embodiments of the present invention have been discussed, numerous additions, substitutions, modifications, and deletions to the invention may be readily suggested to one of skill in the art. It is intended, therefore, that the appended claims encompass such additions, substitutions, modifications, and deletions.

What is claimed is:

1. A flexible structural frame, comprising:
   a structure having a passage, the walls of the passage defining an opening;
   a piece of elastomeric material having a first surface and a second surface, the first surface of the elastomeric material coupled to at least one wall of the passage;
   at least one rigid member coupled to the elastomeric material; and
   at least one tension bearing member coupled to the rigid member, wherein the elastomeric material is compressed when the tension applied to the tension bearing member increases.

2. The frame of claim 1, wherein the structure is an airframe.

3. The frame of claim 1, further comprising a panel, the panel configured to partially fill the opening, wherein the elastomeric material engages the panel when the tension applied to the tension bearing member decreases.

4. The frame of claim 1, wherein the elastomeric material comprises silicone.

5. The frame of claim 1, wherein the rigid member couples to the second surface of the elastomeric material.

6. The frame of claim 1, wherein the rigid member includes a sheave.

7. The frame of claim 1, wherein the elastomeric material has an aperture between the first surface and the rigid member, the tension bearing member passing through the aperture.

8. The frame of claim 1, wherein the tension bearing member is a cable.

9. The frame of claim 8, further comprising:
   a spool coupled to the cable; and
   a motor coupled to the spool, the motor increasing and decreasing the tension applied to the cable by actuating the spool so that the cable winds around and unwinds from the spool.

10. A method for constructing a flexible structural frame, the method comprising:
    forming a piece of elastomeric material having a first surface and a second surface and containing at least one rigid member coupled to a tension bearing member;
    forming a passage in a structure, the passage having walls that define an opening; and
    coupling the first surface of the elastomeric material to at least one wall of the passage, wherein the elastomeric material is compressed when the tension applied to the tension bearing member increases.

11. The method of claim 10, wherein the structure is an airframe.

12. The method of claim 10, wherein the rigid member includes a sheave.

13. The method of claim 10, wherein the elastomeric member comprises silicone.

14. The method of claim 10, wherein the tension bearing member is a cable.

15. The method of claim 14, further comprising coupling the cable to a spool, the spool coupled to a motor that increases and decreases the tension applied to the cable by actuating the spool so that it winds and unwinds the cable.

16. The method of claim 10, wherein the rigid member is located at the second surface of the elastomeric material.

17. The method of claim 10, further comprising lubricating the tension bearing member before forming the piece of elastomeric material.

18. A method for using a flexible structural frame, the method comprising:
    increasing the tension applied to a tension bearing member of the flexible structural frame to compress an elastomeric material of the flexible structural frame, the compression increasing the size of an opening;
    inserting a panel in the opening, the panel partially filling the opening; and
    decreasing the tension applied to the tension bearing member to decrease compression of the elastomeric material, wherein the elastomeric material engages the panel to decrease the gaps between the flexible structural frame and the panel.

19. The method of claim 18, further comprising:
    increasing the tension applied to the tension bearing member to compress the elastomeric material and increase the size of the opening; and
    removing the panel from the opening.

20. The method of claim 18, wherein the elastomeric material comprises silicone.

21. The method of claim 18, wherein the tension bearing member comprises a cable.

22. The method of claim 21, wherein:
    increasing the tension applied to the tension bearing member comprises winding the cable around a spool; and
    decreasing the tension applied to the tension bearing member comprises unwinding the cable from the spool.

23. The method of claim 18, wherein the panel comprises an aircraft door.

* * * * *